United States Patent [19]

Kodama et al.

[11] Patent Number: 5,304,617
[45] Date of Patent: Apr. 19, 1994

[54] FLUORINE-CONTAINING COPOLYMER AND PROCESS FOR ITS PRODUCTION

[75] Inventors: Shun-ichi Kodama; Motoi Kamba, both of Yokohama; Isao Kimura, Urayasu; Kazunori Chiba, Yokohama, all of Japan

[73] Assignee: Asahi Glass Company Ltd., Tokyo, Japan

[21] Appl. No.: 720,437

[22] PCT Filed: Nov. 2, 1990

[86] PCT No.: PCT/JP90/01427
§ 371 Date: Jul. 22, 1991
§ 102(e) Date: Jul. 22, 1991

[87] PCT Pub. No.: WO91/06584
PCT Pub. Date: May 16, 1991

[30] Foreign Application Priority Data
Nov. 2, 1989 [JP] Japan .................. 1-285009

[51] Int. Cl.$^5$ .................................. C08F 12/20
[52] U.S. Cl. ..................... 526/255; 526/242; 526/249; 526/250; 526/254
[58] Field of Search ............. 526/255, 242, 249, 250

[56] References Cited

U.S. PATENT DOCUMENTS 4,970,331 11/1990 Yoshimura et al. .............. 560/80
5,064,920 11/1991 Marumoto et al. ............... 526/249

FOREIGN PATENT DOCUMENTS 0278026 8/1988 European Pat. Off. .
57-34107 2/1982 Japan .
61-275311 12/1986 Japan .
62-143915 6/1987 Japan .
62-174213 7/1987 Japan .
63-110265 5/1988 Japan .
1249839 10/1989 Japan .

OTHER PUBLICATIONS

Surface Coatings Science and Technology, S. Paul, John Wiley & Sons, 1986, pp. 698–705.

Primary Examiner—James J. Seidleck
Assistant Examiner—Mary Critharis
Attorney, Agent, or Firm—Oblon, Spivak, McClelland, Maier & Neustadt

[57] ABSTRACT

This invention relates to a fluorine-containing copolymer which contains a fluoroolefin unit, a vinyl ester or vinyl ether unit, and a hydroxyl group-containing vinyl ether unit in amounts of from 40 to 60 mol%, from 25 to 55 mol% and from 5 to 25 mol%, respectively, and has an intrinsic viscosity of from 0.01 to 0.05 dλ/g as measured in an uncured state at 30° C. in tetrahydrofuran, and the ratio of a weight-average molecular weight and a number-average molecular weight measured by a gel permeation chromatography being not more than 2.0, and a process for its production. The fluorine-containing copolymer of the present invention is excellent in weatherability, retains good coatability even if used as a high solid coating, and provide a coating film excellent in clarity.

7 Claims, 1 Drawing Sheet

FLUORINE-CONTAINING COPOLYMER AND PROCESS FOR ITS PRODUCTION

DESCRIPTION

1. Technical Field

The present invention relates to a fluorinecontaining copolymer, a process for its production, and its use.

2. Background Art

The present inventors previously found that copolymers of fluoroolefin, cyclohexyl vinyl ether, alkyl vinyl ether and hydroxyalkyl vinyl ether can be cured by room temperature curing and bake-curing by means of a curing agent such as melamine or a polyvalent isocyanate, and provide a weatherable coating film which is rich in gloss and excellent in solvent resistance as disclosed in Japanese Unexamined Patent Publication Nos. 34107/1982 and 136662/1983. However, as a result of progress of application of the above-mentioned copolymers as a solvent-based coating, problems were found such that 1) when they were applied to a high solid coating which have been highly demanded in recent years, the viscosity was too high and it was difficult to conduct good coating and 2) the sufficient clarity of the coated surface could not be obtained.

DISCLOSURE OF INVENTION

The present invention has been made to solve the above-mentioned problems and provides the following fluorine-containing copolymer.

A fluorine-containing copolymer comprising polymer units represented by the formulas a), b) and c), respectively in amounts of from 40 to 60 mol%, from 25 to 55 mol% and from 5 to 25 mol%, respectively, and having an intrinsic viscosity of from 0.01 to 0.05 d$\lambda$/g as measured in an uncured state at 30° C. in tetrahydrofuran, the ratio of the weight-average molecular weight and the number-average molecular weight measured by a gel permeation chromatography being not more than 2.0:

a) ($CF_2$— CFX) X is fluorine, chlorine or a perfluoroalkyl or perfluoroalkoxy group having 1 to 3 carbon atoms, b)

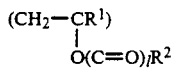

$R^1$ is hydrogen or a methyl group, $R^2$ is an unsubstituted or fluorine-substituted straight-chain, branched-chain or alicyclic alkyl group having 1 to 12 carbon atoms, and $\lambda$ is 0 or 1, and c)

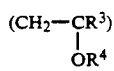

$R^3$ is hydrogen or a methyl group, $R^4$ is an unsubstituted or fluorine-substituted straight-chain, branched-chain or alicyclic alkyl group having a hydroxyl group.

The present invention is also to provide a process for producing the fluorine-containing copolymer, and a coating composition which is composed of a combination of the fluorine-containing copolymer and a curing agent.

The fluorine-containing copolymer of the present invention is composed of polymer units represented by the formulas a), b) and c):

a) ($CF_2$— CFX) X is fluorine, chlorine or a perfluoroalkyl or perfluoroalkoxy group having 1 to 3 carbon atoms, b)

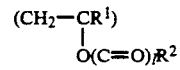

$R^1$ is hydrogen or a methyl group, $R^2$ is an unsubstituted or fluorine-substituted straight-chain, branched-chain or alicyclic alkyl group having 1 to 12 carbon atoms, and $\lambda$ is 0 or 1, and c)

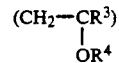

$R^3$ is hydrogen or a methyl group, $R^4$ is an unsubstituted or fluorine-substituted straight-chain, branched-chain or alicyclic alkyl group having a hydroxyl group.

The polymer units can be formed by copolymerizing the monomers represented by the formulas a'), b') and c'), respectively: a') $CF_2=CFX$ X is the same as defined above, b')

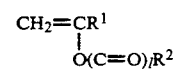

$R^1$, $R^2$ and $\lambda$ are the same as defined above, and c)

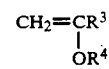

$R^3$ and $R^4$ are the same as defined above.

As the monomer represented by the formula a'), there may be exemplified tetrafluoroethylene, chlorotrifluoroethylene, hexafluoropropylene, perfluoromethyl vinyl ether, perfluoroethyl vinyl ether and perfluoropropyl vinyl ether. Preferred monomers are tetrafluoroethylene and chlorotrifluoroethylene. As the monomer represented by the formula b'), there may be exemplified an alkyl vinyl ether such as ethyl vinyl ether, n-butyl vinyl ether, ethylisopropenyl ether or n-butylisopropenyl ether, a cycloalkyl vinyl ether such as cyclohexyl vinyl ether, a fluoroalkyl vinyl ether such as 2,2,3,3 tetrafluoropropyl vinyl ether, and a vinyl carboxylate such as vinyl acetate, isopropenyl acetate, n-vinyl butyrate, n-isopropenyl butyrate, vinyl valerate, isovinyl valerate, vinyl pivalate or vinyl laurate. Preferred monomers are the alkyl vinyl ether and cycloalkyl vinyl ether as mentioned above, and it is more preferable to use the both of them in combination. As the monomer represented by the formula c'), there may be exemplified a hydroxyalkyl vinyl ether such as $\omega$-hydroxybutyl vinyl ether or $\omega$-hydroxyethyl vinyl ether, a hydroxycycloalkyl vinyl ether such as a monovinyl ether of cyclohexanediol or a monovinyl ether of cyclohexanedimethanol, and $\omega$-hydroxybutylisopropenyl ether. Preferred monomer is the hydroxyalkyl vinyl ether as mentioned above. The polymer units represented by the formulas a), b) and c) each may be a single sort or a mixture of two or more sorts.

The fluorine-containing copolymer of the present invention comprises the polymer units represented by the formulas a), b) and c) in amounts of from 40 to 60 mol%, from 25 to 55 mol% and from 5 to 25 mol%, respectively. When the amount of the polymer unit represented by the formula a) is too small, weatherability will be poor. In each cases where the amount of the polymer unit represented by the formula a) is too small and too large, there are problems from the viewpoint of production. When the amount of the polymer unit represented by the formula b) is too large, weatherability will be poor, and when the amount is too small, the solubility to a solvent will be lower and thus the copolymer becomes unfavorably inappropriate as a base for a solvent-based coating. It is particularly important that the polymer unit represented by the formula c) is contained in a proportion within the range mentioned above from the viewpoint of the improvement of curability without impairing various useful properties as a base for coating material. That is, when the content of the polymer unit represented by the formula c) is too high, since the solubility of the copolymer is changed and the copolymer becomes insoluble to solvents other than a specific solvent such as an alcohol, not only the adaptability as a base for the solvent-based coating is limited, but also the flexibility of the cured coating film is reduced and the gellation time (pot life) in the presence of a curing agent is reduced, whereby unfavorably impairing the applicability of a coating to a great extent. When the above content is too low, various drawbacks are caused wherein the effect for improvement of curability is lost, the curing time is increased, and the solvent resistance of the cured coating film and the stain resistance are reduced, and further the adhesive property to a base or a primer is impaired.

It is important that the copolymer of the present invention has an intrinsic viscosity of from 0.01 to 0.05 d$\lambda$/g, preferably from 0.02 to 0.05 d$\lambda$/g, as measured in an uncured state at 30° C. in tetrahydrofuran. When the viscosity is too low, the mechanical strength tends to be low and thus the formation of the coating film becomes substantially difficult. On the other hand, when the viscosity is too high, in the case where the copolymer is used for a solvent-based coating, there is a tendency that the concentration of a solution is to be lowered from the viewpoint of the viscosity and thus the applicability is impaired. In both cases, clarity is also unfavorably lowered.

The fluorine-containing copolymer has a ratio (Mw/Mn) of a weight-average molecular weight (hereinafter referred to as Mw) and a number-average molecular weight (hereinafter referred to as Mn) in terms of a polystyrene measured by a gel permeation chromatography within a range of not more than 2.0. When Mw/Mn is larger than 2.0, the viscosity of the coating material is elevated and thus the formation of a high density coating becomes difficult. Further, it causes a drawback that the clarity of the coating film is lowered. When Mw/Mn is larger than 2.0, it causes a drawback that the coating film properties, particularly solvent resistance, will be poor.

Such a fluorine-containing copolymer can be produced by conducting copolymerization by reacting a mixture of monomers in predetermined proportions with use of a polymerization initiation source such as a polymerization initiator or an ionizing radiation in the presence or absence of a polymerization medium. Here, the most preferable method is to conduct the polymerization while supplying the monomers to the polymerization system. In a method wherein respective monomers are charged at once at an initial stage of the polymerization, the concentration of the monomers becomes low with the progress of the polymerization. By such a tendency, the polymer produced at the initial stage and the polymer produced at a later stage of the polymerization are different in molecular weight. Accordingly, the copolymer tends to have a large Mw/Mn ratio, i.e. a large molecular weight distribution. Further, when the monomers are charged at once, the concentration of the monomers becomes low at the later stage of the reaction, the reaction speed is considerably lowered, and thus this method is unfavorable from the industrial viewpoint. On the other hand, in a method wherein the polymerization is conducted while supplying the monomers to the polymerization system, since the fluctuation of the monomer concentration is small, it is possible to make the molecular weight distribution small. Further, in the method wherein the monomers are charged at once, it is necessary to make the monomer concentration low for producing a low molecular weight polymer. Namely, it causes a drawback that the yield of a polymer per one batch becomes small. However, in a method wherein the polymerization is conducted while supplying the monomers, although the monomer concentration charged at the initial stage is low, the yield of the polymer per one batch becomes large as compared with the method of charging at once. In addition, the conversion of the monomer to the polymer becomes high as compared with the method of charging at once. That is, the method wherein the polymerization is conducted while supplying the monomers can be said to be a process for production extremely superior in the polymerization efficiency. Also, although the method for supplying the monomers may be both of a continuous method and an intermittent method, a polymer having a small molecular weight distribution can easily be obtained when the supplying is conducted as continuously as possible. Particularly, when the monomers are supplied continuously so that the monomer concentration become constant, the molecular-weight distribution becomes further small. As a method for supplying the monomers so that the monomer concentration become constant, when the monomers contain a gaseous monomer, there are, for example, a method wherein the gaseous monomer is supplied in such a manner that the internal pressure of the polymerization system becomes constant and, at the same time, other monomers are supplied in an amount corresponding to the supplied amount of the gaseous monomer; and a method wherein the monomers are supplied while confirming the monomer concentration in the polymerization system by e.g. a gas chromatography. Also, the monomers may be supplied in such a manner that the concentrations of the respective monomers become constant, and the monomers may be supplied in such a manner that the total concentration of the monomers become constant. If the monomers are supplied in such a manner that the concentrations of respective monomers become constant, a homogeneous polymer can be obtained. If the monomers are supplied in such a manner that the total concentration of the monomers is made constant and the concentrations of respective monomers are changed, functional polymers can be sometimes obtained. Also, in a method wherein the polymerization is conducted while supplying the monomers, a polymerization initiator may be supplied with the supplying of the monomers. If the polymerization is conducted while supplying the polymerization initiator, since the heat of polymerization can be easily controlled, it is possible to obtain the polymer at the same yield in an extremely short time. The polymerization may be terminated by either spontaneous termination or forced termination. It is preferable to select the method of termination appropriately taking into consideration desired properties and the like, although the molecular-weight distribution is smaller in the case of the forced termination. As the method for controlling the molecular weight of the polymer, there are, for example, a method wherein the control is conducted by adjusting the amount of the polymerization initiator and/or the concentration of the monomers, and a method wherein a molecular weight modifier such as a chain transfer agent is used. The method can be freely selected depending on objects, conditions and the like.

In the above-mentioned method for producing the fluorine-containing copolymer, as the polymerization initiator, water-soluble ones or oil-soluble ones can be appropriately used depending on the polymerization manner or the polymerization medium. More specifically, as the water-soluble initiator, there may be exemplified an inorganic initiator, for example, a persulfate such as potassium persulfate, a hydrogen peroxide, or a redox initiator composed of a combination of these and a reducing agent, for example, sodium hydrosulfite or sodium thiosulfate, and also a system wherein a small amount of iron, ferrous salt, silver nitrate or the like is coexisted with them, etc.; an organic initiator such as a peroxide of a dibasic acid, for example, a peroxide of disuccinic acid, a peroxide of diglutaric acid or a peroxide of monosuccinic acid, and a dihydrochloride of azobisisobutylamidine. As the oil-soluble initiator, there may be exemplified a peroxyester type peroxide such as t-butylperoxy isobutyrate or t-butylperoxy acetate; a dialkylperoxy dicarbonate such as diisopropylperoxy dicarbonate; benzoylperoxide; and azobisisobutyronitrile. The amount of the polymerization initiator used can be appropriately changed depending on the type, the reaction conditions of the polymerization and the like, but is usually from about 0.005 to 5% by weight, particularly from 0.05 to 0.5% by weight, based on the monomers to be copolymerized.

In conducting the copolymerization, the reaction system is not particularly limited, and a suspension polymerization, an emulsion polymerization, a solution polymerization and the like can be practiced. However, from the viewpoint of the stability of the operation of the polymerization, the easiness in separation of the produced copolymer and the like, preferably practiced are the emulsion polymerization in an aqueous medium; the solution polymerization using as a solvent an alcohol such as t-butanol, ester, an aromatic compound such as xylene, or a saturated hydrocarbon halide containing one or more fluorine atoms, and the like. When the copolymerization is conducted in the aqueous medium, it is preferable to add a basic buffering agent so that the pH value of the liquid during the polymerization becomes less then 4, preferably 6. In the case of the solution polymerization, the addition of a basic substance is also effective.

In such a copolymerization, the copolymerization temperature can be selected from the range of from $-30°$ C. to $+150°$ C. depending on the polymerization initiation source, types of the polymerization medium and the like to select appropriately the optimum value. However, when the copolymerization is conducted in an aqueous medium, the temperature to be practiced is from about 0° C. to 100° C., preferably from 10° C. to 90° C. Also, although the reaction pressure can be appropriately selected, it is desirable to use the pressure usually within the range of about from 1 to 100 $kg/cm^2$, particularly from 2 to 50 $kg/cm^2$. It is possible to conduct the copolymerization appropriately in the coexistence of a chain transfer agent to depress the intrinsic viscosity of the produced copolymer within the above-mentioned range.

The copolymer of the present invention contains as a hardening site the hydroxyl group based on the polymer unit represented by the formula c), and can be thermoset by using a curing agent such as a melamine type curing agent, a urea type curing agent, a polybasic acid type curing agent, or a block polyvalent isocyanate type curing agent which are used for conventional thermosetting acryl coating. As the melamine type curing agent, there may be exemplified a butylated melamine, a methylated melamine, an epoxy-modified melamine and the like. The melamine type curing agent can be selected from those having various modification degrees ranging from 0 to 6 depending on the use thereof, and the self condensation degree thereof can be appropriately selected. As the urea type curing agent, there may be exemplified a methylated urea, a butylated urea and the like. As the polybasic acid type curing agent, there may be exemplified a long-chain aliphatic dicarboxylic acid, an aromatic polyvalent carboxylic acid or its anhydride, and the like. As the block polyvalent isocyanate type curing agent, used is a polyvalent isocyanate mentioned below whose isocyanate group is masked with a blocking agent. With the use of the melamine or urea type curing agent, the curing can be accelerated by adding an acidic catalyst.

The copolymer of the present invention can be cured at an ordinary temperature by using a polyvalent isocyanate. As the polyvalent isocyanate, particularly useful are a non-yellowing diisocyanate such as hexamethylene diisocyanate or isophoronediisocyanate, and its modified product such as a polyol modified product or a nurated modified product. When the curing is conducted at an ordinary temperature by using the polyvalent isocyanate, it is possible to accelerate the curing by an addition of a conventional catalyst such as dibutyltin dilaurate.

In the production of the composition for the solvent-based coating from the copolymer of the present invention, various solvents can be used, for example, an aromatic hydrocarbon such as xylene or toluene, an alcohol such as n-butanol, an ester such as butyl acetate, a ketone such as methyl isobutyl ketone, a glycol ether such as ethyl cellosolve, and also various commercially available thinners.

The mixing of such a copolymer and solvent can be conducted by using various apparatuses such as a ball mill, a paint shaker, a sand mill, a jet mill, a three-roll mill or a kneader which are usually used for producing a coating material. At this time, there may be added a pigment, a dispersion stabilizer, a viscosity modifier, a repelling agent, a gellation inhibitor, an ultraviolet absorber or the like.

When the copolymer of the present invention is used for producing a thermosetting composition for coating, namely, baking coating, a curing agent such as a melamine type curing agent, a urea type curing agent, a polybasic acid type curing agent, a block polyvalent isocyanate type curing agent or the like is simultaneously mixed in the mixing step mentioned above to produce a one-pack type coating.

On the other hand, when the composition is a normal temperature setting type coating which uses a non-block polyvalent isocyanate, the curing agent component is separately prepared to provide a two-pack type coating. In this case, the coating can provide a coating film which has a usable time of about 1 to 10 hours, is cured at room temperature for from several hours to several days, and has good properties by controlling the type of isocyanate and catalyst and their amounts to be added, the concentration of the copolymer, the contents of the unit based on the hydroxyalkyl vinyl ether in the copolymer, and the like.

BEST MODE FOR CARRYING OUT THE INVENTION

EXAMPLE 1

Figure 1:
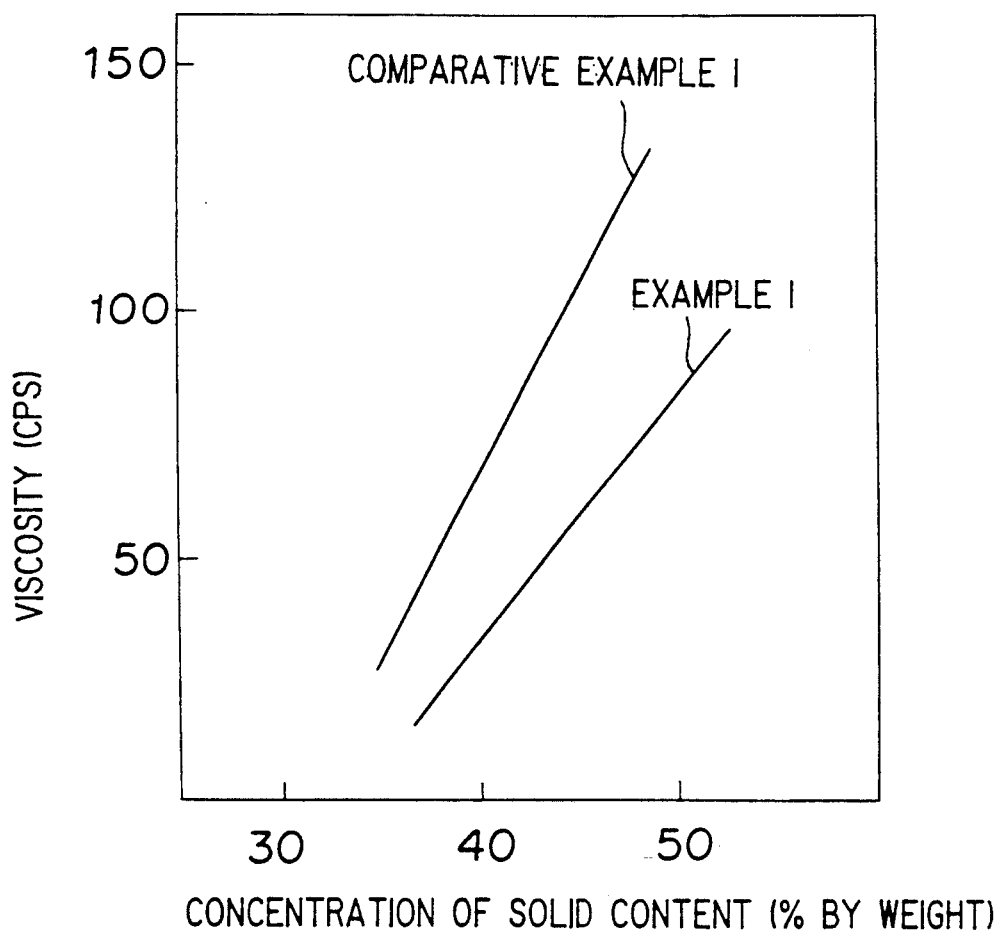
FIG. 1 is a graph showing the relationships between the concentrations of solid contents of the coating materials, which use the fluorine-containing copolymers in Example 1 and Comparative Example 1, and the viscosity of their solutions.

Into a stainless steel autoclave having an internal capacity of 2.5 $\lambda$ and equipped with a stirrer (pressure resistance: 30kg/cm$^2$), 651 g of xylene, 184 g of ethanol, 19.1 g of cyclohexyl vinyl ether (hereinafter referred to as CHVE), 10.9 g of ethyl vinyl ether (hereinafter referred to as EVE), 23.5 g of $\omega$-hydroxybutyl vinyl ether (hereinafter referred to as HBVE) and 11.6 g of potassium carbonate were charged, and cooling deaeration and pressurizing with a nitrogen gas were repeated to remove dissolved air. Then, 58.9 g of chlorotrifluoroethylene (hereinafter referred to as CTFE) was introduced into the autoclave, and the mixture was heated. When the temperature in the autoclave was elevated to 65° C., the pressure was 1.0 kg/cm$^2$G. After that, 9 m$\lambda$ of a xylene solution of 50% t-butylperoxypivalate (hereinafter referred to as PBPV) was added to initiate the reaction. With the reduction of the pressure, 470 g of CTFE, 153 g of CHVE, 87 g of EVE and 188 g of HBVE were continuously added to continue the reaction while maintaining the pressure. In the progress of the reaction, 23 m$\lambda$ of a xylene solution of 50% PBPV was continuously added. After 14 hours, the feeding of respective monomers was stopped and the reaction was continued until 0.5 kg/cm$^2$G, and then the autoclave was cooled with water to terminate the reaction. After the temperature lowered to room temperature, an unreacted monomer was purged and the autoclave was opened. The polymer thus obtained was isolated by drying under reduced pressure.

The yield of polymer was 991 g, the concentration of polymer was 49.9% and the degree of reaction of the monomers was 96.8%. The obtained polymer had an intrinsic viscosity (in THF, at 30° C.) ([$\eta$]) of 0.040 d$\lambda$/g. The weight-average molecular weight and numberaverage molecular weight in terms of polystyrene as measured by GPC, and their ratio were 3500, 6500 and 1.86, respectively. The polymer composition of the copolymer quantified by identification by use of $^{13}$Cnmr spectrum was 51.0/14.9/15.1/19.0 with respect to CTFE/CHVE/EVE/HBVE (mol%).

EXAMPLES 2 to 4

Copolymers were produced under the conditions as shown in Table 1. The values of [$\eta$], Mw, Mn, Mw/Mn and the content of HBVE of the obtained copolymers are also indicated.

The conditions of polymerization not indicated in the Table were the same as in Example 1.

TABLE 1

|  |  | Example 2 | Example 3 | Example 4 | Example 5 | Comp. Ex. 1 | Comp. Ex. 2 |
|---|---|---|---|---|---|---|---|
| Charging at initial stage | CTFE (g) | 29.5 | 58.9 |  |  | 198.7 | 332.4 |
|  | TFE |  |  | 50.6 | 50.6 |  |  |
|  | CHVE | 9.6 | 19.1 | 19.1 | 15.3 | 64.6 | 108.1 |
|  | EVE | 5.5 | 7.3 | 10.9 |  | 36.9 | 61.8 |
|  | IBVE |  |  |  | 25.2 |  |  |
|  | HBVE | 11.8 | 29.4 | 23.5 | 11.8 | 79.3 | 132.7 |
|  | PBPV (ml) | 13.5 | 9.0 | 8.0 | 10.0 | 7.0 | 4.3 |
| Charging at posterior stage | CTFE (g) | 179.5 | 470 |  |  |  |  |
|  | TFE |  |  | 404 | 404 |  |  |
|  | CHVE | 48.7 | 897 | 87 | 153 |  |  |
|  | EVE | 27.8 | 87 | 87 |  |  |  |
|  | IBVE |  |  |  | 202 |  |  |
|  | HBVE | 59.8 | 188 | 188 | 94 |  |  |
|  | PBPV (ml) | 45.5 | 22.0 | 19.0 | 21.0 |  |  |
|  | Polymerization pressure (kg/cm$^2$G) | 0.5 | 1.0 | 3.0 | 3.0 | 2.6→0.4 | 3.8→0.2 |
|  | Polymerization time (hr) | 11 | 15 | 14 | 15 | 10 | 6 |
|  | Yield of polymer (%) | 90.7 | 94.0 | 95.5 | 93.0 | 85.4 | 87.0 |
|  | [$\eta$] | 0.019 | 0.041 | 0.045 | 0.038 | 0.040 | 0.093 |
|  | Mw | 2500 | 6320 | 6460 | 5640 | 7380 | 15400 |
|  | Mn | 1810 | 3360 | 3400 | 3050 | 3350 | 5960 |
|  | Mw/Mn | 1.38 | 1.88 | 1.90 | 1.85 | 2.20 | 2.59 |
|  | HBVE content (mol %) | 19.5 | 24.4 | 19.1 | 14.8 | 19.5 | 19.3 |

IBVE is isobutyl vinyl ether
TFE is tetrafluoroethylene

COMPARATIVE EXAMPLE 1

Into a stainless steel autoclave having an internal capacity of 2.5 λ and equipped with a stirrer (pressure resistance: 30 kg/cm²), 1098 g of xylene, 310 g of ethanol, 64.6 g of cyclohexyl vinyl ether, 36.9 g of ethyl vinyl ether, 79.3 g of ω-hydroxylbutyl vinyl ether and 4.3 g of potassium carbonate were charged, then dissolved air was removed by repeating the cooling deaeration and pressurizing with a nitrogen gas. Then, 198.7 g of chlorotrifluoroethylene was introduced into the autoclave, and heated. When the temperature in the autoclave was elevated to 65° C., the pressure was 2.6 kg/cm²G. After that, 7 mλ of xylene solution of 50% t-butylperoxypivalate was added thereinto to initiate the reaction. Then, the reaction was continued under stirring for 10 hours, and when the pressure was lowered to 0.4 kg/cm²G, the autoclave was cooled with water to terminate the reaction. After the temperature was lowered to room temperature, unreacted monomers were purged, and the autoclave was opened. The obtained polymer was isolated by drying under reduced pressure. The composition of the obtained copolymer was 50.4/15.2/14.9/19.5 by molar ratio with respect to CTFE/CHVE/EVE/HBVE, respectively. Values [η], Mw, Mn and Mw/Mn of the copolymer are shown in Table 1.

COMPARATIVE EXAMPLE 2

The reaction of Comparative Example 1 was repeated in the same manner as in Comparative Example 1 except for the polymerization conditions not indicated in Table 1. Values [η], Mw and Mn of the copolymer are also indicated in Table 1.

TEST EXAMPLES

The copolymers of Examples 1 to 5 and Comparative Examples 1 to 2 were used for production of coating materials and applied by coating under the conditions as indicated in Table 2.

FIG. 1 shows the relationships between the concentrations of solid contents of the coating materials and the viscosity of their solutions at 25° C. Table 3 shows the properties of the coated film.

TABLE 2

| Recipe for coating | Copolymer | 100 parts by weight |
|---|---|---|
| | Xylene | 54 |
| | Melamine resin varnish*1 | 50 |
| | n-Butanol | 20 |
| | Solvesso #100*2 | 20 |
| Coating conditions | Substrate | An aluminum plate*4 treated with Allodine*3 |
| | Undercoat | Acrylmedlamine black coating |
| | Overcoat | The above composition was added with Solvesso*5 and diluted so that Ford cup viscosity become 23 sec./20° C., and then applied by spray coating. Baking was conducted at 140° C. for 30 minutes. The film thickness was about 30 μ. |

*1 Mitsui Toatsu Chemicals, Inc. LIVAN-20SE-60
*2 Esso Petroleum Co.
*3 NIPPON PAINT CO., LTD.
*4 Mitsubishi Alumi Co. 5052H34
*5 Esso Petroleum Co.

TABLE 3

| Copolymer | | Example 1 | Example 2 | Example 3 | Example 4 |
|---|---|---|---|---|---|
| Clarity of coating film | ICM value *1 | 90.4 | 93.0 | 90.5 | 87.5 |
| | PGD value *2 | 0.9 | 0.9 | 0.9 | 0.9 |
| Solvent resistance*3 | | ◎ | ◎ | ◎ | ◎ |
| Crosscut test*4 | | 100/100 | 100/100 | 100/100 | 100/100 |
| Pencil hardness*5 | | H | H | H | F |
| Shock resistance*6 | | ○ | ○ | ○ | ○ |

| Copolymer | | Example 5 | Comp. Ex. 1 | Comp. Ex. 2 |
|---|---|---|---|---|
| Clarity of coating film | ICM value *1 | 88.5 | 81.8 | 85.0 |
| | PGD value *2 | 0.9 | 0.9 | 0.7 |
| Solvent resistance*3 | | ◎ | ◎ | ○ |
| Crosscut test*4 | | 100/100 | 100/100 | 100/100 |
| Pencil hardness*5 | | F | H | F |
| Shock resistance*6 | | ○ | X | ○ |

*1 Clarity measuring apparatus ICM-ID model produced by Suga Shikenki K.K.
*2 Clarity and gloss measuring apparatus PGD IV model produced by Nihon Shikisai Kenkyusho
*1 and *2 are both methods for measuring the appearance of the coating film objectively. In both cases, the larger the value is, the superior the clarity of the image is.
*3 After the xylol rubbing test (100 times) was conducted, the appearance of the coating film was observed visually. ◎: no change, ○: substantially no change, Δ: a little swelled
*4 100 crosscuts were made in accordance with JIS-K-5400 6.15. A cellophane adhesive tape was adhered with pressure on the crosscuts. Then, the cellophane tape was detached therefrom and the number of the remaining crosscuts was counted to determine the adhesiveness.
*5 Conducted in accordance with JIS-K-5400 6.14 (pencil scratch test)
*6 Conducted in accordance with Du Pont impact test (½"φ, 500 g, 40 cm). ○: good, X: formation of crack or peeling off

INDUSTRIAL APPLICABILITY

The copolymer of the present invention is excellent in surface hardness and gloss when used as a base for coating, and can provide under mild conditions a coating film which has visibility and is excellent in solvent resistance, stain resistance and weatherability. The copolymer is useful as not only a baking coating which is applied to a color steel plate, a color aluminum plate, an aluminum sash and the like, but also dry-type coating which can be practiced in working place. The material of the substrate is not limited to a metal, and the copolymer is extremely useful as a coating for an inorganic material such as glass, cement or concrete, and an organic material such as a plastic, for example, FRP, polyethylene, polypropylene, ethylene-vinyl acetate copolymer, nylon, acryl, polyester, ethylene-polyvinyl alcohol copolymer, vinyl chloride or vinylidene chloride, or lumbers. The copolymer of the present invention is particularly useful as a raw material for a high solid coating which is attributable to prevent environmental pollution and as a raw material of a coating for vehicles which has a high clarity.

We claim:

1. A fluorine-containing copolymer comprising polymer units represented by the formulas a), b) and c), respectively in amounts of from 40 to 60 mol%, from 25 to 55 mol% and from 5 to 25 mol%, respectively, and having an intrinsic viscosity of from 0.01 to 0.05 dλ/g as measured in an uncured state at 30° C. in tetrahydrofuran, the ratio of the weight-average molecular weight and the number-average molecular weight measured by a gel permeation chromatography being not more than 2.0:

a) (CF$_2$—CFX) X is fluorine, chlorine or a perfluoroalkyl or perfluoroalkoxy group having 1 to 3 carbon atoms, b)

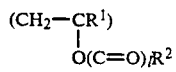

R$^2$ is hydrogen or a methyl group, R$^2$ is an unsubstituted or fluorine-substituted straight-chain, branched-chain or alicyclic alkyl group having 1 to 12 carbon atoms, and λ is 0 or 1, and c)

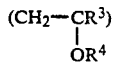

R$^3$ is hydrogen or a methyl group, R$^4$ is an unsubstituted or fluorine-substituted straight-chain, branched-chain or alicyclic alkyl group having a hydroxyl group.

2. The fluorine-containing copolymer according to claim 1, wherein the polymer unit represented by the formula a) is a unit derived from at least one monomer selected from tetrafluoroethylene and chlorotrifluoroethylene, the polymer unit represented by the formula b) is a unit derived from at least one monomer selected from alkyl vinyl ether, cycloalkyl vinyl ether and vinyl carboxylate, and the polymer unit represented by the formula c) is a unit derived from at least one monomer selected from hydroxyalkyl vinyl ether and hydroxycycloalkyl vinyl ether.

3. The fluorine-containing copolymer according to claim 2, wherein the copolymer comprises, as the polymer unit represented by the formula b), at least one unit derived from alkyl vinyl ether and at least one unit derived from cycloalkyl vinyl ether.

4. A process for producing a fluorine-containing copolymer which comprises polymerizing monomers represented by the formulas a'), b') and c') respectively in the presence of a polymerization initiator, wherein the polymerization is conducted while supplying the monomers to a polymerization system:

a') CF$_2$=CFX  X is fluorine, chlorine or a perfluoroalkyl or perfluoroalkoxy group having 1 to 3 carbon atoms, b')

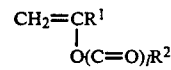

R$^1$ is hydrogen or a methyl group, R$^2$ is an unsubstituted or fluorine-substituted straight-chain, branched-chain or alicyclic alkyl group having 1 to 12 carbon atoms, and λ is 0 or 1, and c')

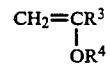

R$^3$ is hydrogen or a methyl group, R$^4$ is an unsubstituted or fluorine-substituted straight-chain, branched-chain or alicyclic alkyl group having a hydroxyl group.

5. The process according to claim 4, wherein the polymerization is conducted while supplying a polymerization initiator to the polymerization system.

6. The process according to claim 4, wherein the monomer represented by the formula a') is at least one monomer selected from tetrafluoroethylene and chlorotrifluoroethylene, the monomer represented by the formula b') is at least one monomer selected from alkyl vinyl ether, cycloalkyl vinyl ether and vinyl carboxylate, and the monomer represented by the formula c') is at least one monomer selected from hydroxyalkyl vinyl ether and hydroxychloroalkyl vinyl ether.

7. The process according to claim 6, wherein at least one alkyl vinyl ether and at least one cycloalkyl vinyl ether are used as the monomer represented by the formula b').

* * * * *